United States Patent [19]

Derber et al.

[11] Patent Number: 5,182,372
[45] Date of Patent: Jan. 26, 1993

[54] ANILINE-BASED OIL-SOLUBLE AZO DYES

[75] Inventors: Bernd Derber, Limburgerhof; Guenter Hansen, Ludwigshafen; Helmut Reichelt, Neustadt; Christos Vamvakaris, Kallstadt; Georg Zeidler, Dannstadt-Schauernheim, all of Fed. Rep. of Germany

[73] Assignee: BASF Aktiengesellschaft, Ludwigshafen, Fed. Rep. of Germany

[21] Appl. No.: 589,789

[22] Filed: Sep. 26, 1990

[30] Foreign Application Priority Data

Sep. 26, 1989 [DE] Fed. Rep. of Germany ....... 3931999

[51] Int. Cl.$^5$ ...................... C09B 29/085; C10L 1/00
[52] U.S. Cl. ..................... 534/857; 534/858
[58] Field of Search ................ 534/857, 858

[56] References Cited

U.S. PATENT DOCUMENTS

| | | | |
|---|---|---|---|
| 3,734,857 | 5/1973 | Moiso et al. | 534/858 X |
| 4,011,209 | 3/1977 | De Feo et al. | 534/858 X |
| 4,762,767 | 8/1988 | Haas et al. | 430/167 |
| 4,904,765 | 2/1990 | Derber et al. | 534/573 X |

FOREIGN PATENT DOCUMENTS

| | | | |
|---|---|---|---|
| 61-281156 | 12/1986 | Japan | 534/857 |
| 1142239 | 2/1969 | United Kingdom | |

OTHER PUBLICATIONS

A.C.N.A., Chemical Abstracts, vol. 82, No. 172600e (1975).

Dickey et al., Journal of Organic Chemistry, vol. 24, No. 2, pp. 187–196 (1959).
Colour Index, Second Edition 1956, C.I. 11,125, vol. 3, 2 pages.
Colour Index, Second Edition 1956, C.I. 11,200, vol. 3, 2 pages.

Primary Examiner—Mary C. Lee
Assistant Examiner—Fiona T. Powers
Attorney, Agent, or Firm—Oblon, Spivak, McClelland, Maier & Neustadt

[57] ABSTRACT

Azo dyes of the formula

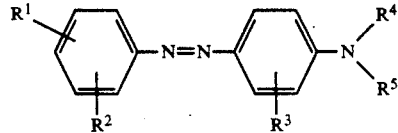

in which
  $R^1$, $R^2$ and $R^3$ independently denote hydrogen, $C_1$–$C_4$-alkyl or $C_1$–$C_4$-alkoxy,
  $R^4$ denotes $C_1$–$C_6$-alkyl and
  $R^5$ denotes $C_2$–$C_8$-alkyl which is substituted by hydroxy and may be interrupted by 1, 2 or 3 oxygen atoms,
  provided that the total number of carbon atoms in the radicals $R^4$ and $R^5$ is at least 5, mineral oils containing one or more of said novel dyes and the use of said dyes for marking mineral oils.

3 Claims, No Drawings

ANILINE-BASED OIL-SOLUBLE AZO DYES

The present invention relates to novel azo dyes of formula I

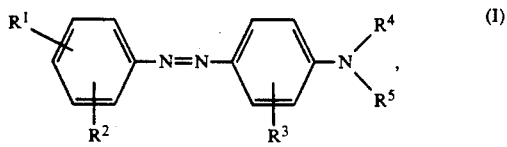

in which

R$^1$, R$^2$ and R$^3$ are the same or different and independently denote hydrogen, C$_1$-C$_4$-alkyl or C$_1$-C$_4$-alkoxy, R$^4$ denotes C$_1$-C$_6$-alkyl and R$^5$ denotes C$_2$-C$_8$-alkyl which is substituted by hydroxy and may be interrupted by 1, 2 or 3 oxygen atoms, provided that the total number of carbon atoms in the radicals R$^4$ and R$^5$ is at least 5, and to mineral oils containing said novel dyes and to the use of said dyes for marking mineral oils.

DE-A 2,129,590 discloses azo dyes in which the diazo component and the coupling component are both members of the aniline series. The radical of the coupling component bears an acetalized hydroxyalkyl group.

According to EP-A 256,460, these components, when used in conjunction with oil-soluble dyes, are suitable for marking mineral oils. Detection is effected by reacting the acetalized dye with aqueous mineral acid to give a color change. The drawback of this method is the use of an acetalized dye, the preparation of which involves an additional processing step.

Colour Index Nos. C.I. 11,125 and C.I. 11,200 describe dyes in which the coupling component is [N-(n-butyl)-N-(2-hydroxyethyl)]aniline and the diazo component is derived from 2-chloro-4-nitroaniline or 2,4-dinitro-6-bromoaniline. However, these dyes have been found to show poor suitability for marking mineral oils.

It is thus an object of the present invention to provide novel azo dyes in which the diazo component and the coupling component are both members of the aniline series and in which the radical of the coupling component accommodates a hydroxyalkyl group. Such dyes are to show a favorable degree of suitability for marking mineral oils.

Accordingly, we have found the azo dyes of formula I defined above.

All of the alkyl groups contained in the above formula I may be linear or branched.

Examples of values of R$^1$, R$^2$, R$^3$ and R$^4$ are methyl, ethyl, propyl, isopropyl, butyl, isobutyl, s-butyl and t-butyl.

Examples of additional values of R$^1$, R$^2$ and R$^3$ are methoxy, ethoxy, propoxy, isopropoxy, butoxy, isobutoxy and s-butoxy.

Examples of additional values of R$^4$ are pentyl, isopentyl, neopentyl, t-pentyl and hexyl.

Examples of values of R$^5$ are 2-hydroxyethyl, 2- or 3-hydroxypropyl, 3-hydroxyprop-2-yl, 2-hydroxybutyl, 4-hydroxybutyl, 1-hydroxybut-2-yl, 3-hydroxybut-2-yl, 3-hydroxbutyl, 5-hydroxy-3-oxapentyl, 2,5-diethyl-5-hydroxy-3-oxapentyl and 8-hydroxy-3,6-dioxaoctyl.

If, in formula I, R$^5$ denotes alkyl interrupted by oxygen atoms, such alkyl radicals are preferably those which are interrupted by one or two oxygen atoms, more preferably those interrupted by one oxygen atom.

Preferred azo dyes of formula I are those in which R$^3$ is in the ortho-position relative to the azo bridge.

Particularly preferred azo dyes of formula I are those in which

R$^1$, R$^2$ and R$^3$ independently denote hydrogen, methyl or methoxy,

R$^4$ denotes C$_1$-C$_4$-alkyl and

R$^5$ denotes C$_2$-C$_4$-alkyl substituted by hydroxy.

We particularly prefer those azo dyes of formula I in which R$^1$ and R$^2$ independently denote hydrogen or methyl and R$^3$ denotes hydrogen.

Of very special interest are those azo dyes of formula I in which R$^4$ is ethyl and R$^5$ is 2-hydroxybutyl, 1-hydroxybut-2-yl or 3-hydroxybut-2-yl, or in which R$^4$ is n-butyl and R$^5$ is 2-hydroxyethyl.

The azo dyes of formula I proposed in the present invention can be prepared by conventional methods. For example, an aniline of formula II

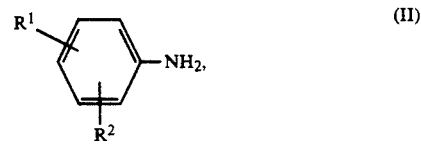

in which R$^1$ and R$^2$ have the meanings stated above, may be diazotized in known manner and then coupled with an N-alkylaniline of formula III

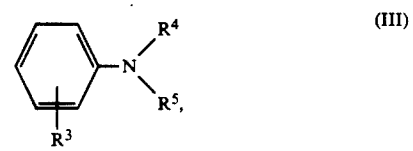

in which R$^3$, R$^4$ and R$^5$ have the meanings stated above.

The anilines II and N-alkylanilines III are largely known compounds or can be prepared by known methods.

For example, amino compounds of formula IV

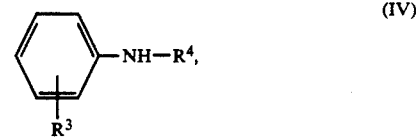

in which R$^3$ and R$^4$ have the meanings stated above, can be oxalkylated with ethylene oxide, propylene oxide or 1,2- or 2,3-butylene oxide. Such oxalkylation may be effected, for example, in substance or in the presence of a little water or a little aqueous acetic acid at a temperature generally ranging from 80° to 100° C. The molar ratio of amino compound IV to alkylene oxide is usually from 1:1 to 1:2.

If it is desired to introduce a 3-hydroxypropyl or 4-hydroxybutyl radical, one way of doing so is to react the amino compound IV with 3-chloropropanol, 3-chloropropyl acetate, 4-chlorobutanol or 4-chlorobutyl acetate. If said esters are used, they will saponified after the reaction with amino compound IV.

Our novel azo dyes of formula I show very good solubility in organic solvents, particularly in aromatic or aliphatic hydrocarbons.

They may be used, with advantageous results, for marking mineral oils. Accordingly, mineral oils containing one or more azo dyes of formula I are also subject matter of the present invention.

By mineral oils we mean, for example, fuels such a gasoline, kerosine and diesel fuel and oils such as fuel oil and engine oil.

The dyes of the invention are particularly suitable for marking mineral oils which require labelling for tax purposes for example. To minimize the cost of such labelling it is desirable to use, as colorants, dyes having as high a yield as possible. However, even the so-called 'strong' dyes cannot be discerned visually when used to a high degree of dilution in mineral oils.

The novel azo dyes have the advantage of being useful as marking substances in addition to their dye characteristics, since they provide intense coloration when reacted with aqueous or aqueous-alcoholic acids. This result is surprising, because EP-A 256,460 states that only those compounds can act as marking agents which have an acetalized hydroxyalkyl group in the coupling component.

When used for the purpose of marking mineral oils, the dyes of the invention generally take the form of a solution. Suitable solvents are preferably aromatic hydrocarbons such as toluene and xylene. In such solutions, the concentration of dye is generally from 30 to 50% by weight of the solution, to keep the viscosity of the latter down to a desired level.

The indication of the dyes of the invention contained in mineral oils as marking substances is very simple, even when the concentration thereof is as low as approx. 0.1 ppm. The simple procedure required to detect the novel dyes is particularly interesting, since it is usually only necessary to shake approx. 100 ml of the test mineral oil with 10 ml of aqueous acid to obtain the color reaction.

Acids suitable for effecting the color reaction are mainly aqueous mineral acids such as hydrochloric acid and sulfuric acid, or alternatively, aqueous-alcoholic (preferably ethanolic) hydrochloric acid, all used in a concentration of from about 3 to 20%, preferably from 5 to 10%, by weight.

The invention is illustrated below by the following Examples.

EXAMPLE 1

9.3 g of aniline were dissolved in a mixture of 50 ml of water and 50 ml of 5N hydrochloric acid at room temperature. 100 g of ice were added, followed by a concentrated aqueous solution containing 6.9 g of sodium nitrite. Diazotization was complete after 30 minutes at 0° to 5° C. The excess nitrite was removed with amidosulfonic acid. To the solution of the diazonium salt there was added dropwise a solution of 21.7 g of 3-methyl-N-ethyl-N-(2-hydroxybutyl)aniline in 125 ml of toluene at from 10° to 15° C., with vigorous stirring. The pH of the reaction mixture was then raised by the addition of 2.5N sodium acetate solution. Coupling was complete after stirring overnight at 15°-20° C. The organic phase was washed several times with water at 60° C. until free from salt and then distilled to remove the toluene to give 31 g of a tarry dye of the formula

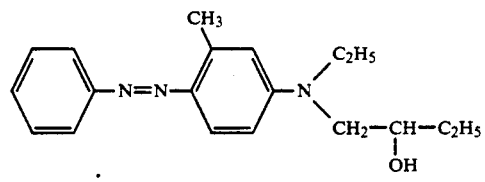

showing good solubility in aromatics [$\lambda_{max}$(toluene):413 nm], yielding a yellow color.

The dyes listed in the Table below were prepared in similar manner.

| Example No. | Dye | Color in aromatics | $\lambda_{max}$ (toluene) [nm] |
|---|---|---|---|
| 2 | ![structure with CH3, N=N, C2H5, (CH2)4OH, CH3] | yellow | 412 |
| 3 | ![structure with OCH3, N=N, C2H5, (CH2)4OH] | yellow | 412 |
| 4 | ![structure with N=N, C4H9(n), C2H4OH] | yellow | 413 |
| 5 | ![structure with N=N, CH3, (CH2)4OH] | yellow | 413 |

-continued

| Example No. | Dye | Color in aromatics | $\lambda_{max}$ (toluene) [nm] |
|---|---|---|---|
| 6 | Phenyl-N=N-(2-methyl-4-(N-C4H9(n))(N-C2H4OH))phenyl | yellow | 412 |
| 7 | Phenyl-N=N-(2-methyl-4-(N-CH3)(N-C2H4OC2H4OH))phenyl | yellow | 414 |
| 8 | 2-methylphenyl-N=N-(2-methyl-4-(N-CH3)(N-(CH2)4OH))phenyl | yellow | 415 |
| 9 | Phenyl-N=N-(4-(N-C2H5)(N-(CH2-CH(C2H5)-O-)2H))phenyl | yellow | 413 |
| 10 | 2,6-dimethylphenyl-N=N-(4-(N-C4H9*)(N-C2H4OH))phenyl | yellow | 415 |
| 11 | Phenyl-N=N-(4-(N-C2H5)(N-CH2-CH(OH)-C2H5))phenyl | yellow | 417 |
| 12 | Phenyl-N=N-(2-methyl-4-(N-C2H5)(N-CH(C2H5)-CH2OH))phenyl | yellow | 417 |
| 13 | 2-methylphenyl-N=N-(2-methyl-4-(N-C2H5)(N-CH2-CH(OH)-C2H5))phenyl | yellow | 412 |
| 14 | 2-methoxyphenyl-N=N-(4-(N-C2H5)(N-CH2-CH(OH)-C2H5))phenyl | yellow | 412 |

-continued

| Example No. | Dye | Color in aromatics | $\lambda_{max}$ (toluene) [nm] |
|---|---|---|---|
| 15 | [structure: 3-methylphenyl-N=N-(2-methylphenyl)-N(C₂H₅)(CH(C₂H₅)CH₂OH)] | yellow | 413 |
| 16 | [structure: phenyl-N=N-phenyl-N(C₂H₅)(CH(C₂H₅)CH₂—O—)₂H] | yellow | 413 |
| 17 | [structure: phenyl-N=N-(2-methylphenyl)-N(CH₃)(C₂H₄O)₃H] | yellow | 414 |
| 18 | [structure: phenyl-N=N-(2-methylphenyl)-N(CH₃)(C₂H₄O)₄H] | yellow | 415 |

*) isomer mixture

EXAMPLE 19

Application

Unleaded gasoline was marked with a 60% solution of the dye of Example 1 in xylene.

The dosage rate was 15 mg of said solution per liter of gasoline.

100 ml of the gasoline under test were vigorously shaken (5 minutes in a shaker) with 10 ml of a mixture consisting of 5 ml of 10% w/w hydrochloric acid and 5 ml of ethanol. The alcoholic/aqueous phase showed a distinct change of colour to red. The mixture was left to stand for a short period to allow the two phases to separate. The red phase could then be colorimetrically compared with a solution of known concentration, thus allowing the dye content to be determined quantitatively. Using this method, it was possible to indicate distinctly the presence of marked gasoline in a mixture containing 20 times as much unmarked gasoline (dye concentration 0.45 ppm).

EXAMPLE 20

Application

Honey-colored light fuel oil was marked with a 60% w/w solution of the dye of Example 1 in xylene.

The dosage rate was 20 ppm. When 100 ml of said yellow-colored fuel oil were shaken with 5 ml of 10% w/w hydrochloric acid, the aqueous phase turned red.

We claim:

1. An azo dye of formula I

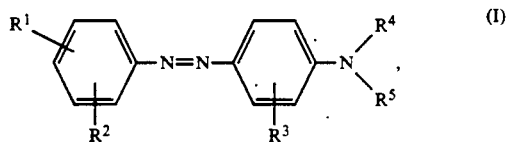

in which
R¹, R² and R³ are the same or different and independently denote hydrogen, $C_1$–$C_4$-alkyl or $C_1$–$C_4$-alkoxy,
R⁴ denotes $C_1$–$C_6$-alkyl and
R⁵ denotes $C_2$–$C_8$-alkyl which is substituted by hydroxy,
provided that the total number of carbon atoms in the radicals R⁴ and R⁵ is at least 5.

2. An azo dye as claimed in claim 1, wherein R³ is in the ortho-position relative to the azo bridge.

3. An azo dye as claimed in claim 1, wherein
R¹, R² and R³ independently denote hydrogen, methyl or methoxy,
R⁴ denotes $C_1$–$C_4$-alkyl and
R⁵ denotes $C_2$–$C_4$-alkyl substituted by hydroxy.

* * * * *